(12) United States Patent
Bartminn et al.

(10) Patent No.: US 12,504,004 B2
(45) Date of Patent: Dec. 23, 2025

(54) WIND POWER PLANT FOUNDATION STRUCTURE

(71) Applicants: Daniel Bartminn, Elmshorn (DE); Artur Czarnecki, Hamburg (DE)

(72) Inventors: Daniel Bartminn, Elmshorn (DE); Artur Czarnecki, Hamburg (DE)

(73) Assignee: RWE Renewables GmbH, Essen (DE)

( * ) Notice: Subject to any disclaimer, the term of this patent is extended or adjusted under 35 U.S.C. 154(b) by 244 days.

(21) Appl. No.: 18/306,315

(22) Filed: Apr. 25, 2023

(65) Prior Publication Data

US 2023/0258158 A1 Aug. 17, 2023

Related U.S. Application Data

(63) Continuation of application No. PCT/EP2021/077843, filed on Oct. 8, 2021.

(30) Foreign Application Priority Data

Oct. 28, 2020 (DE) ...................... 10 2020 128 325.3

(51) Int. Cl.
*F03D 13/00* (2016.01)
*E02D 27/42* (2006.01)
(Continued)

(52) U.S. Cl.
CPC .......... *F03D 13/25* (2016.05); *E02D 27/425* (2013.01); *E02D 27/52* (2013.01); *F03D 13/22* (2016.05);
(Continued)

(58) Field of Classification Search
CPC ........ F03D 13/00; F03D 13/10; F03D 13/112; F03D 13/0136; F03D 13/25; F03D 13/22;
(Continued)

(56) References Cited

U.S. PATENT DOCUMENTS 4,185,940 A * 1/1980 Spies ...................... E21D 15/18
248/354.1
4,232,846 A * 11/1980 Bressani ................. F21V 21/10
248/910

(Continued)

FOREIGN PATENT DOCUMENTS

DE 102007020483 A1 10/2008
DE 102012013618 B3 9/2013
(Continued)

*Primary Examiner* — Chi Q Nguyen
(74) *Attorney, Agent, or Firm* — Reinhart Boerner Van Deuren P.C.

(57) ABSTRACT

A wind turbine foundation structure comprising a hollow structural element with a circumferential wall extending in the longitudinal direction. A first cable feed-through breaking through the wall is arranged in the wall. A transition piece with an overlap region projects into the hollow structural element and a transition region projects out of the hollow structural element at the end face. A circumferential wall extends in the longitudinal direction. A second cable feed-through which breaks through the wall is arranged in the overlap region in the wall. The first and the second cable feed-through bear against one another in an at least partially overlapping manner in the assembled state of the hollow structural element and the transition piece.

34 Claims, 11 Drawing Sheets

(51) Int. Cl.
*E02D 27/52* (2006.01)
*F03D 13/20* (2016.01)
*F03D 13/25* (2016.01)

(52) U.S. Cl.
CPC .. *E02D 2200/1685* (2013.01); *E02D 2450/00* (2013.01)

(58) Field of Classification Search
CPC ................. E02D 27/425; E02D 27/52; E02D 2200/1685; E02D 2450/00
See application file for complete search history.

(56) References Cited

U.S. PATENT DOCUMENTS

| | | | | |
|---|---|---|---|---|
| 5,363,610 A * | 11/1994 | Thomas | .............. | E04B 1/34347 52/126.6 |
| 5,515,655 A * | 5/1996 | Hoffmann | ................ | E02D 27/01 52/157 |
| 7,191,569 B2 * | 3/2007 | Brown | .............. | E04F 15/02488 52/157 |
| 7,506,775 B2 * | 3/2009 | Hartzell | .............. | E04H 12/2253 248/161 |
| 7,765,770 B2 * | 8/2010 | Fournier | .............. | E04H 12/2253 52/843 |
| 10,785,924 B2 * | 9/2020 | Dong | ...................... | F16M 11/22 |
| 12,173,696 B2 * | 12/2024 | Voss | ......................... | F03D 13/20 |
| 2013/0140823 A1 * | 6/2013 | Henry | ..................... | H02S 10/12 290/53 |
| 2017/0284120 A1 * | 10/2017 | White | .................. | E04H 12/2215 |
| 2022/0154486 A1 * | 5/2022 | Turnquist | ................. | B28B 23/00 |

FOREIGN PATENT DOCUMENTS

| | | |
|---|---|---|
| DE | 202015002655 U1 | 5/2015 |
| EP | 3255210 A2 | 12/2017 |
| EP | 3561201 A1 | 10/2019 |
| EP | 3696326 A1 | 8/2020 |
| JP | S5061809 A | 5/1975 |
| JP | H08141669 A | 6/1996 |
| JP | 2017115373 A | 6/2017 |
| WO | WO 2019/076865 A1 | 4/2019 |
| WO | WO 2020/074421 A1 | 4/2020 |
| WO | WO 2020/157196 A1 | 8/2020 |

* cited by examiner

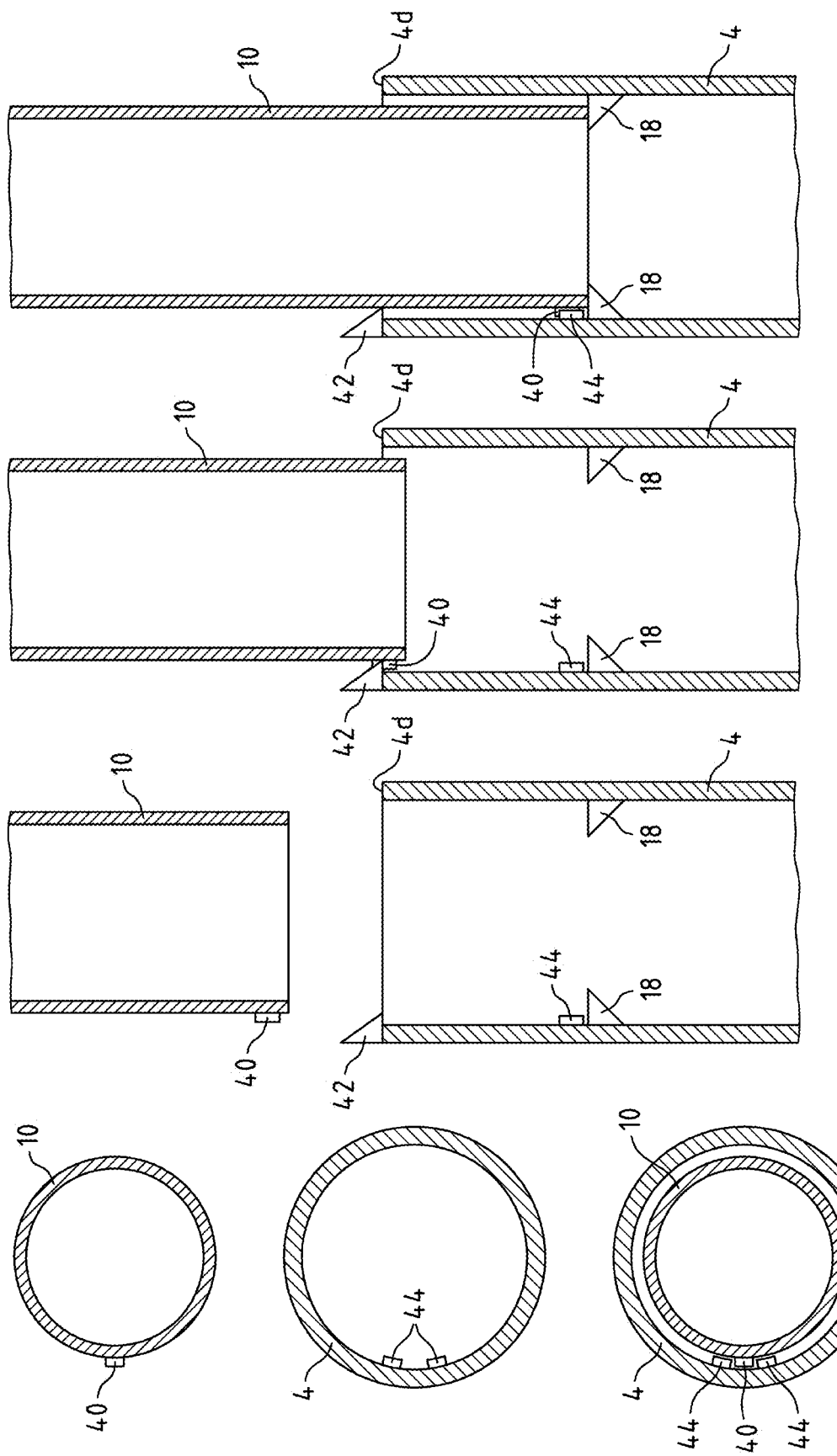

WIND POWER PLANT FOUNDATION STRUCTURE

CROSS-REFERENCE TO RELATED PATENT APPLICATIONS

This patent application is a continuation of International Application No. PCT/EP2021/077843, filed on Oct. 8, 2021, which claims the benefit of priority to German Patent Application No. 10 2020 128 325.3, filed Oct. 28, 2020, the entire teachings and disclosures of both applications are incorporated herein by reference thereto.

FIELD

The subject matter relates to a wind power plant foundation structure. Wind power plants within the meaning of the subject matter may be wind turbines, transformer stations, substations, switch stations or the like.

BACKGROUND

Wind power plants are usually founded on hollow structural elements. The hollow structural elements are founded with an embedment depth between 5 m and 50 m into the ground. The hollow structural elements preferably have a length of more than 45 m, in particular between 50 m and 100 m. In offshore plants, the hollow structural elements are founded in such a way that they have embedment depths of between 5 m and 50 m and protrude between 10 m and 30 m from the water surface. The hollow structural elements are mostly used in water depths between 10 m and 50 m. However, water depths of up to 150 m are also possible.

The hollow structure elements have diameters between 4 m and 18 m, but preferably up to 12 m. Traditionally, hollow structure elements are formed as steel cylinders that are driven into the seabed by pile driving or vibration. The use of steel as a material for the hollow structural elements results in high costs due to their production as well as their high dead weight. In addition, the connection with so-called "transition pieces" at the top by means of grout joints or bolted connections is necessary.

Using grout joints or slip-joint connections, transition pieces are inserted into the hollow structural elements used for the foundation. The electricity produced with the help of the wind turbine is fed via an electric cable to a substation and from there to the electric power grid. The cables are either routed to the ground on the outside of the tower through so-called J-tubes or inside the tower, i.e. inside the transition piece and/or the hollow structural element.

However, it may be desirable to reduce the length and thus the weight of the hollow structural elements, especially those made of concrete, so that they no longer protrude from the water surface at the same embedment depth. But then it happens that the transition piece is tied to the hollow structural element below the water surface and there is an overlap area below the water surface.

Due to installation specifications, it may be necessary for the cable routed inside the hollow structural element to be routed to the outside where the hollow structural element and the transition piece intersect in the longitudinal direction. In this area, the transition piece and hollow structural element (both may also referred to below as piles synonymously) are connected to each other using the so-called slip-joint method or grout method. The two piles project into each other and there is an overlap area. A necessity to lead the cable out of the pile in the area of such an overlap may exist, for example, if the cables are to be feed-through of the pile near the ground, in particular near the sea ground. It may happen that the part of the transition piece protruding from the hollow structural element is too far from the ground and the cable, and if the cable were feed-through of the transition piece, would hang freely for too long a distance until it reaches the ground. On the other hand, the overlap length between the transition piece and the hollow structural element may be such that the area of the hollow structural element below the overlap area is too close to the ground or already integrated within the ground and therefore the cable cannot be feed-through there either. It may therefore be necessary to lead the cable out of the pile in the overlap area.

BRIEF SUMMARY

The subject matter was thus based on the object of providing a foundation structure in which a cable can be feed-through of the foundation structure near the ground. This task is solved by a foundation structure according to claim 1.

The present foundation structure has a hollow structural element which extends in the longitudinal direction and is formed in the longitudinal direction by a circumferential wall. The wall has two distal ends, each bounded by end faces. A first end face may be a top end face and a second end face may be a bottom end face. Top and bottom faces may be defined by the position of the hollow structural element in the final installed state. Here, in the installed state, the lower end face is founded in the ground and the upper end face protrudes from the ground.

The wall can be made of a mineral building material.

The associated transition piece is attached to the hollow structural element, in particular it can be plugged on, plugged in or plugged over. The Transition Piece may include at least one ship landing device with a ladder.

The transition piece may have an outer diameter congruent to the inner diameter of the wall of the hollow structural member. Such a pile or cylinder element may be inserted into the hollow structural member. An annular gap between the inner shell surface of the hollow structural element and the outer shell surface of the transition piece may be ensured by webs, spacers or the like. Concrete or mortar can be filled into this annular gap so that a permanent connection is formed between the hollow structural element and the transition piece.

The transition piece is connected to the hollow structural element by means of a grout joint or by the slip-joint method. In this case, the transition piece is inserted into the hollow structural element with an overlap area and a transition area protrudes from the end face of the hollow structural element. The transition piece is preferably monolithic, tubular in shape and extends in a longitudinal direction. In the installed state, this longitudinal direction is preferably collinear with the longitudinal direction of the hollow structural element.

The transition piece has a circumferential wall, wherein within the wall there is arranged a cable feed-through in the overlap region which breaks through the wall. Through this cable feed-through, the cable suspended inside the foundation structure can be passed through the wall of the transition piece.

At the same time, in order to guide the cable to the outside in the overlap area, it is also necessary to guide it out of the hollow structural element. For this reason, the wall of the hollow structural element also has a cable feed-through.

The cable feed-throughs (cable entry holes) are openings that break through the respective wall. A cable feed-through may be understood as one or a plurality of holes which are approximately adapted to the outer diameter of the cable to be fed through. In order to allow a cable to pass through both the hollow structural element and the transition piece, it is proposed that the first and second cable feed-throughs abut each other in an at least partially overlapping manner when the hollow structural element and the transition piece are assembled. This allows the cable to pass directly through the two walls without having to thread it in the annular space between the hollow structural element and the transition piece.

The transition piece is inserted into the hollow structural element in such a way that an angular position about the longitudinal axis of these two elements of the respective cable feed-throughs is substantially the same, so that in the inserted state the cable feed-throughs overlap each other, that is, in a projection parallel to the radius of the piles they are at least partially superimposed.

According to one embodiment, it is proposed that a cable from inside the transition piece is passed through the first and second cable feed-throughs. In the assembled state of the wind turbine, not only the foundation structure but also the tower including the turbine and the wind turbine are assembled. From the generator, which is located in the nacelle, the cable runs through the tower, the transition piece and the hollow structural element to the cable feed-throughs and is feed-through of them.

The cable is subject to increased stress from currents, especially in offshore installations, so the free cable length outside the foundation structure until the cable is on the ground should be limited. On the other hand, the cable should not be routed out of the structure too close to the seabed, otherwise the minimum bending radii for transferring the cable from the horizontal to the predominantly vertical cannot be maintained.

In particular, it is proposed that the cable feed-through of the hollow structural element in the installed condition is between 1.0 m and 5 m preferably between 1.5 m and 3.5 m above the seabed. This is especially true even after the scour protection has been installed around the foundation structure. The seabed is defined here as the vertical plane indicated in the plan documents as the water depth below the reference plane LAT (lowest Astronomical tide-lowest water level).

According to one embodiment, it is proposed that a seal abutting the shell surfaces is circumferentially arranged in an annular space between the inner shell surface of the hollow structural element and the outer shell surface of the transition piece. Particularly in the case of a grout connection, the seal is intended to ensure that grout material does not pass through the cable feed-throughs to the outside as well as to the inside. This is ensured by the seal. The seal is preferably arranged circumferentially, in particular completely circumferentially in the annular space. The seal preferably runs in a plane perpendicular to the longitudinal extent of the hollow structural element.

In the case of a grout connection, grout material is introduced into the annular space after the transition piece has been inserted into the hollow structural element. In order to prevent the grout material entering from above from reaching the cable feed-throughs, it is proposed that the seal is arranged above the cable feed-through in the longitudinal direction of the hollow structural element. In order to prevent, if necessary, the feed-through of liquid from outside into the annular space via the cable feed-throughs, a seal may be arranged below the cable feed-through in the direction of the hollow structural element.

Sealing of the cable feed-throughs can be achieved not only by a seal along the annular space, but according to an embodiment also by a seal arranged around the cable feed-throughs. In this case, a seal running around the cable feed-throughs in a closed ring is provided in the annular space between the inner shell surface of the hollow structural element and the outer shell surface of the transition piece at a radial distance from the cable feed-throughs. The seal is arranged around the cable feed-throughs in such a way that it is located in each case at a radial distance from both circumferential outer edges of both cable feed-throughs. In particular, the seal is arranged in a projection parallel to the radius of the hollow structural element in an annular, in particular circular or elliptical, manner around the cable feed-throughs. Such a seal also prevents grout material, which is introduced into the annular space, from reaching the cable feed-throughs and escaping outwardly or inwardly.

Often, the annular space is relatively narrow, especially if a slip-joint connection is made rather than a grout connection. However, even with a grout joint, the annular gap is relatively small and only a small tolerance is allowed when inserting the transition piece into the hollow structural element. To prevent the seal from interfering with the insertion of the transition piece into the hollow structural element or being damaged during insertion, it is also proposed that the seal be expandable. In particular, the seal is shaped such that its volume is expandable after the hollow structural element and transition piece are assembled. For example, the seal can be inflated, either pneumatically or hydraulically, by applying a filler material to it. A volume can be kept inside the seal as a cavity. After assembly, this volume can be filled with the filling material under pressure so that the seal closes the annular gap between the hollow structural element and the transition piece in the area of the cable feed-throughs. Alternatively, the seal may comprise swellable (e.g. clay-containing) material which swells upon contact with water.

According to one embodiment, it is proposed that the center of the cable entry of the hollow structural element is offset from the center of the cable entry of the transition piece in the longitudinal direction of the hollow structural element. The distance between the centers of the cable entries is thereby preferably smaller than an opening radius of at least one of the cable entries. In particular, the cable entry of the transition piece lies above the cable entry of the hollow structural element in the longitudinal direction, provided that the transition piece is inserted into the hollow structural element. Provided that the transition piece lies outside in the overlap area, the center of the cable entry opening is below the center of the cable entry opening of the hollow structural element. The cable routed from the top of the tower to the cable entries runs in a radius from inside the tower to outside the tower. As a result, the cable not only runs radially out of the tower in relation to its center axis, but also extends in the longitudinal direction. This is accounted for by the offset cable feed-throughs.

In particular, it is proposed that an upper edge of the cable feed-through of the transition piece is arranged above a lower edge of the cable feed-through of the hollow structural element. Such an offset may in particular be at least 0.25 m, preferably 0.5 m. However, the offset is not so large that the cable feed-throughs no longer overlap. There always remains a clear width through both cable feed-throughs.

According to one embodiment, it is proposed that the annular space between the hollow structural element and the transition piece is at least partially grouted. To prevent grout material from interfering with the cable feed-throughs, it is proposed that an upper edge of the grout connection in the longitudinal direction of the hollow structural element is below at least a lower edge of one of the cable feed-throughs. The grout connection is made such that it is completely below the cable feed-throughs in the overlap region. If necessary, a further grout connection is to be provided above the upper top edges of the higher of the two cable entry openings. In this case, grout seals must be provided all around at the height of the cable entry.

The cable feed-throughs shall be overlapping, concentric if necessary, at least vertical axes of the cable feed-through can be in one plane. When the tubes of the transition piece and hollow structural element are inserted into each other, it must be ensured that the cable feed-throughs overlap each other in the installed state. However, when plugged into each other, the cable entry holes can be twisted against each other. This is particularly problematic in offshore applications, since it is not readily visible from the installation vessel and/or difficult to control how the tubes twist against each other due to waves. Also, the rope suspending the tubes, especially the rope on which the transition piece is suspended, is not torsionally stiff, so that twisting of the tubes relative to each other can occur.

To prevent this, an insertion aid can be provided, for example. Thus, an insertion aid can be provided at a frontal upper edge of the hollow structural element. This insertion aid can project radially inwards and be arranged on the inner shell surface of the hollow structural element. Also, the insertion aid may alternatively or cumulatively project beyond the end surface to form a receiving funnel for the transition piece. The insertion aid may open in the form of a groove or funnel away from the end face edge of the hollow structural element in a funnel shape to allow the insertion aid of the transition piece to be threaded therein. The same can also apply to the insertion aid of the transition piece. This insertion aid can project radially outward. The insertion aid of the transition piece may be arranged on the lower end-face edge and/or the outer shell surface of the transition piece. This insertion aid can also point away from the lower end-face edge of the transition piece in a funnel-shaped manner.

It is also possible for an insertion aid to extend longitudinally on the transition piece at a distance from the outer wall. The distance to the outer wall of the insertion aid can be such that the insertion aid can be slipped over the hollow structural element. Then, a radially outwardly facing insertion aid may be provided on the hollow structural element so that the insertion aids do not interfere with the threading process as such, in particular the insertion of the transition piece into the hollow structural element.

The insertion aids can be arranged away from the annular space on the outer shell surfaces of both the transition piece and the hollow structural element. The insertion aids cause a relative alignment of the azimuth angles of the hollow structural element and the transition element to be defined. The azimuth angles may be indicated by an angular position about the longitudinal axis of the hollow structural element and transition piece.

According to an embodiment, it is proposed that the insertion aids comprise radially inwardly and/or radially outwardly projecting projections and/or recesses which engage with each other.

After the cable is feed-through of the hollow structural element, it is freely suspended in the air or in the water, in particular the open sea. In order to make the length of the freely suspended cable as short as possible, a wedge-shaped construction element may be arranged at the bottom with a radial distance to the hollow structure element. This wedge-shaped construction element is arranged only in a limited angular section around the hollow structure element, unlike the scour protection, which is filled completely circumferentially around the hollow structure element.

In particular, the structural element is formed of a mineral building material as described herein. The structural element can receive the freely suspended cable in the manner of a ramp and guide it to the ground. Wedge-shaped means that the construction element forms a ramp for the cable that tapers in a radial direction away from the hollow construction element. The structural element is independently inventive and may be provided in combination with the other features described herein. In particular, the structural element may also be used to provide a cable feed-through in only the transition piece outside the overlap region. In this case, the free cable length is higher than for a cable feed-through in the overlap area, but this can be reduced by the construction element.

To accommodate the cable, and in particular to prevent the cable from being pushed away from the construction element by ocean currents, for example, a recess extending in the radial direction may be arranged on a surface of the construction element to accommodate the cable. The radial direction refers to the hollow structural element and points radially away therefrom. The cable, which is feed-through of one or both tubes, can be inserted into the recess and thus be guided in a defined guide to the ground.

According to one embodiment, it is proposed that a radially inwardly pointing stop is formed on the inner shell surface of the wall in an end region of the hollow structural element. The stop may be formed by a plurality of "ledges" formed at angular intervals from one another. In particular, the stop may be formed by radially inwardly facing projections. The stop may be partially or completely circumferential. The stop serves as a stop for the transition piece, which is inserted into the hollow structural element. A suitable axial arrangement of the stop ensures an annular gap between the inner shell surface of the hollow structural element and the outer shell surface of the transition piece, into which concrete or grout can be poured to form a grout joint. Alternatively, the ledges on the outer shell surface are to be arranged projecting radially outward if the transition piece is slipped over the hollow structural element. As a further alternative, the slip joint is designed as a slip joint.

The hollow structural element preferably has an embedment depth of at least 7 m. This may be sufficient to adequately base the hollow structural element in the ground. Binding lengths between 7 m and 20 m are preferred.

According to one embodiment, it is proposed that the hollow structural element is monolithically manufactured over at least a longitudinal extension of 50%. It is also proposed that the hollow structural element is monolithically fabricated in the region of its lower end up to at least 5 m above the seabed/terrain bottom. The monolithic part of the hollow structural element is at least partially founded in the ground.

The hollow structural element may have a length extension at which the upper edge of the hollow structural element in the installed state ends at least 5 m above the seabed and in particular ends no more than 2 times the outer or inner diameter of the hollow structural element, in particular less than 3 times the outer or inner diameter of the hollow structural element above the seabed.

The monolithic end of the hollow structural element is preferably mechanically prestressed. The compressive force generated in the concrete by prestressing is such that the tensile forces occurring during driving and/or vibration of a monolithic pile of the same mass and dimension are compensated for at least 70%, in particular at least 85%. The prestressing force is preferably that prestressing force which is determined as the net prestressing force after deduction of relaxation of the prestressing steel and/or of creep and shrinkage losses in the concrete and friction losses.

The compressive force generated by prestressing in the concrete is such that the tensile forces occurring in a monolithic pile of the same mass and dimension during operation and/or under maximum load are compensated (overcompressed) by at least 45%, in particular at least 65%.

According to an embodiment example, it is proposed that the hollow structural element is hollow cylindrical. Due to the cylindrical shape, the structural integrity is increased, so that the hollow structural element can absorb higher bending moments.

According to an embodiment example, it is proposed that the building material comprises cement at least in parts. In particular, the building material is concrete mixed from cement, gravel, sand and water, which is hardened after casting.

For a good load-bearing capacity, it has been found that the water-cement ratio (w/c) of the building material is <0.45, in particular <0.35 or <0.3.

The moments and shear forces occurring in wind turbines are adequately absorbed by the hollow structural element in particular if the building material has a strength class of at least C40/50, preferably C70/85, especially C100/115 according to EN 206 and EN1992.

Sufficient long-term stability of the foundation structure over the service life of the wind turbine, especially in the case of permanent feed-through by water, is achieved in particular by the building material having a pore content (air pores) of less than 5%, preferably less than 3%, in particular less than 2%. The total porosity measured with mercury pressure porosity should be P28d<12 vol-% after 28 days and P90d<10 vol-% after 90 days.

Sufficient load-bearing capacity of the hollow structural element is achieved in particular by the building material having a cement content of at least 350 kg/m$^3$, preferably more than 450 kg/m$^3$, in particular more than 650 kg/m$^3$.

In particular, for the permanent feed-through of water when installing the foundation structure offshore, sufficient durability is achieved by the building material having a porosity of P28d<12% by volume when measured by mercury pressure porosimetry. P28d is a measurement over 28 days. Preferably, the porosity is also less than 10 vol. %. For P90d, that is a measurement over 90 days, the porosity is preferably <10 vol %, in particular <8 vol %.

According to an embodiment example, it is proposed that the wall is mechanically prestressed. The prestressing presses over cracks and thus keeps the surfaces largely free of tensile stress, which is advantageous in the case of fluctuating torque loads in particular. The pretensioning force is preferably 5%, in particular more than 15%, greater than the compressive strength of the wall. The pretensioning force is preferably applied in the longitudinal direction.

For increased stability under dynamic environmental conditions, it is proposed that the building material is metal reinforced. The metallic reinforcement is in particular a steel reinforcement. The reinforcement can be provided by fibers or reinforcing bars. Fiber reinforcement may also be provided by carbon fiber, glass fiber, or metallic fiber.

The reinforcement can be such that it has at least more than 26 mm preferably at least more than 40 mm concrete cover at 90% of the measuring points, preferably at 98% of the measuring points.

The building material may be reinforced with ferritic stainless reinforcing steel. The reinforcement may have a chromium content not exceeding 18 M %. The reinforcement may contain molybdenum.

The material may be reinforced with austenitic stainless reinforcing steel. The reinforcement may have at least 5 M % in particular between 5 M %-14 M % nickel and/or between 12 M %-22 M % in particular 15 M %-20 M % chromium.

The building material may be reinforced with ferritic-austenitic stainless reinforcing steel. The reinforcement may have at least 18 M %, in particular between 15 M %-20 M % chromium and 2 M %-8 M % nickel and optionally molybdenum.

According to an embodiment example, it is proposed that the top face is metal reinforced, in particular that a metal reinforcement protrudes from the top face. Via the top face, the hollow structural element is founded in the ground, in particular driven or vibrated. This means that during the foundation itself, the mechanical load on the top end face is very high. To withstand these mechanical loads and in particular to prevent damage, a metallic reinforcement of the end face is preferred. If a circumferential web is provided that protrudes from the end face, the foundation tool, either the vibratory tool or the pile driving tool can rest on this reinforcement and not directly on the building material of the hollow structural element. Since a metallic reinforcement is considerably more ductile than a mineral building material, this prevents damage during foundation.

According to one embodiment, it is proposed that the density of the reinforcement in an end region of the hollow structural element at its upper and/or lower end face is greater than in a central region of the hollow structural element. The mechanical load at the end faces is higher than in a center region, especially during foundation. The foundation tool, in particular a pile-driving tool or a vibration tool, engages on the top end face. At the bottom end face, the hollow structural element is driven into the ground and the bottom end face must displace the ground. At these two end faces the reinforcement is larger, i.e. the density of the reinforcement is increased compared to a center area.

For a landing platform or an installation platform, a radially outwardly facing skirt may be formed on the outer shell surface of the wall in an end region of the hollow structural element. The skirt may be partially or completely circumferential. In particular, the skirt is spaced from the upper end face in the axial direction.

For increased stability, it is proposed that the building material is sealed, in particular with a sealing film. Such a sealing foil may be, for example, an aluminum-butyl sealing foil.

Another aspect combinable with any of the features described herein may be in a cable routing within a boat landing platform. A boat landing platform may be provided on the transition piece, in particular as a radially outwardly facing at least partially circumferential platform. This platform is attached to the transition piece. The platform is protected from impacts by docking ships by so-called fender tubes. The fender tubes are attached to the transition piece at a radial distance from the latter, in particular welded.

Together with the transition piece, the fender tubes span a surface within which the landing platform is at least partially arranged.

It is now possible to provide these tubes not only for protection against bumping by landing ships, but also as cable guides. For example, it is possible to extend the fender tubes, which are otherwise limited in length, beyond the hollow structural element. The fender tubes are, as mentioned, in a radial condition to the outer shell surface of the transition piece. It is proposed that this radial distance is greater than the radial distance of the outer wall of the hollow structural element from the outer wall of the transition piece. Thus, when the fender tubes are mounted or when the transition piece is mounted together with the fender tubes, it is ensured that the fender tubes do not abut against the hollow structural element.

The fender tubes run along the outside of the hollow structural element. In particular, the fender tubes are arranged in an overlap region extending beyond the hollow structural element towards the ground. A cable lowered from the tower can be routed out of the tower above the fender tubes, and can be routed in the fender tubes to the lower outlet. At the lower outlet of the fender tubes, the cable can then be free-hanging or guided to the ground.

Additionally or alternatively, it is possible for ladder spars from ladders on the landing platform to be used as grout lines. Such ladder spars are hollow tubes arranged on the landing platform. The distance between the ladder spars and the transition piece is less than the distance between the fender tubes. In particular, the ladder spars can be guided up to the joint between the hollow structural element and the transition piece. The grout material can be fed into the annular gap between the hollow structural element and the transition piece via the ladder spars. For this purpose, the ladder spars can be provided with funnels on the upper side, for example, in order to be able to fill the grout material particularly easily.

BRIEF DESCRIPTION OF DRAWINGS

The subject matter is explained in more detail below with reference to a drawing showing embodiments. In the drawing show:

FIG. 4b is a sectional view through a cable feed-through;
FIG. 6a is a wind turbine with cable feed-through;
FIGS. 8a and 8b are embodiments of insertion aids.

DETAILED DESCRIPTION

Figure 1:
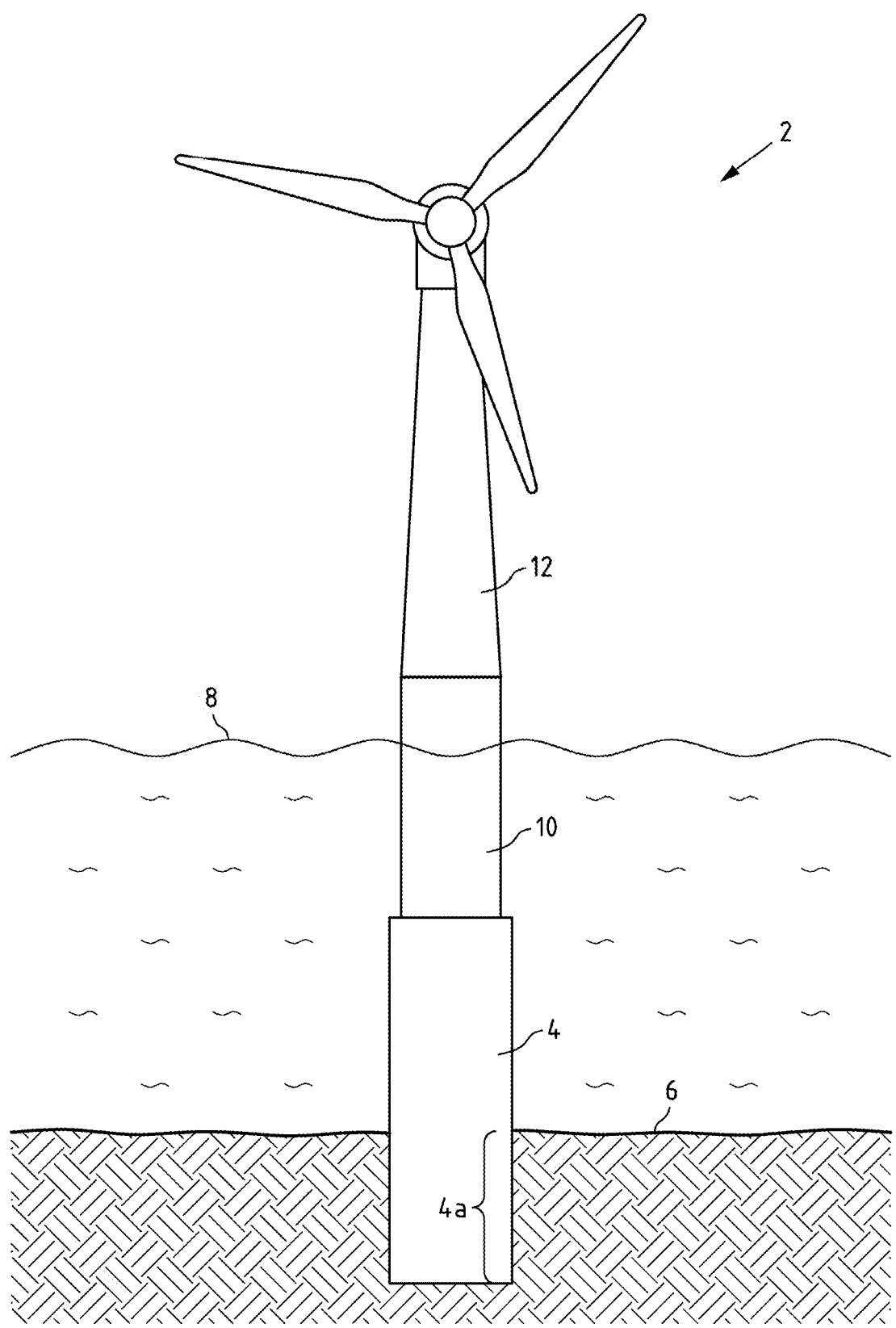
FIG. 1 is a wind turbine with a wind turbine foundation structure.

FIG. 1 shows a wind turbine 2, which is based offshore. All statements made here apply to both offshore foundation structures and onshore foundation structures.

The wind turbine 2 is founded in a seabed 6 via a wind turbine foundation structure. A hollow structural element 4 is founded into the seabed with an embedment length 4a. The hollow structural element 4 is connected to a transition piece 10, for example via a grout connection or a slip-joint connection, which is conventionally known. The transition piece 10 extends above the water surface 8.

A wind turbine 12 is arranged on the transition piece 10 here as an example, but a sub-station, a substation or the like may also be provided. For the foundation of the hollow structural element 4, the latter is driven or vibrated into the seabed 6.

Figure 2:
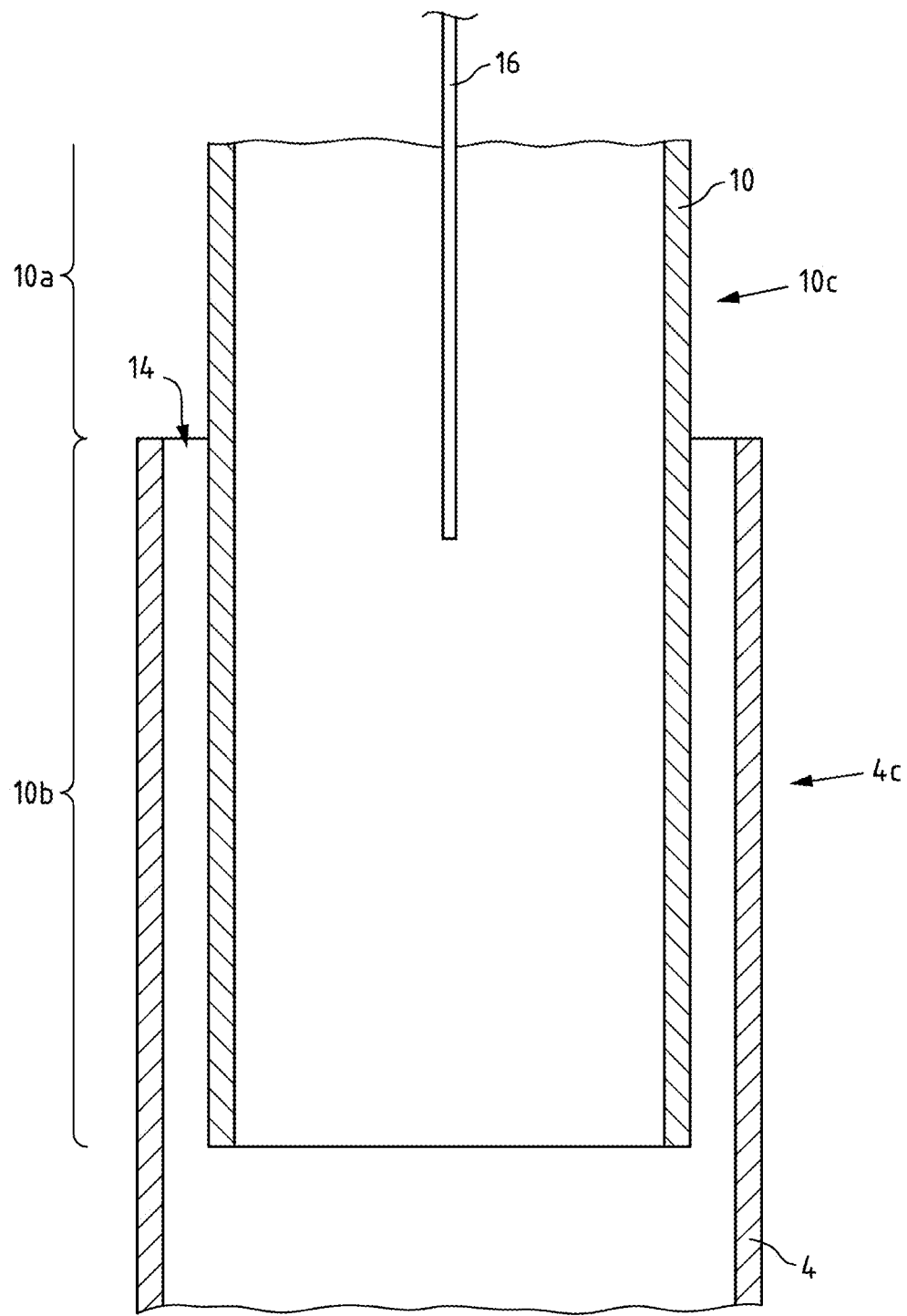
FIG. 2 is a schematic view of an overlapping area.

The transition piece 10 is inserted into the hollow structural element 4 with an overlap area 10b, as shown schematically and highly simplified in FIG. 2. The transition piece 10 protrudes from the hollow structural element 4 with a transition area 10a.

In particular, the hollow structural element 4 is formed as a monopile. The hollow structural element 4 has a wall 4c. The wall 4c is in particular formed of concrete.

The transition piece 10 is also formed as a hollow structural element and its wall 10c is preferably formed of steel.

A connection between the hollow structural element 4 and the transition piece 10 is made in the so-called grout joint or slip joint.

The grout joint method is presented here as an example. However, the explanations regarding the cable feed-throughs apply equally to slip-joint connections.

In the grout joint process, an annular space (annular gap) 14, which is shown greatly enlarged in FIG. 2, is filled with grout between the hollow structural element 4 and the transition piece 10. This process in itself is well known.

However, a problem arises with grout joints as well as with slip joints if a cable 16, which is led down from the wind turbine 12 inside the transition piece 10, is to be led to the outside in the overlap area 10b, i.e. through both the wall 10c of the transition piece 10 and the wall 4c of the hollow structural element 4. For this purpose, cable feed-throughs must be provided in both walls 4c, 10c. These must be aligned with each other and the hollow structural elements 4, 10 must not be twisted against each other. In addition, in the case of a grout connection, the grout material must not leak out of the cable feed-throughs.

Suitable measures such as insertion aids, alignment aids or the like can be used to align the hollow structural elements 4, 10 with respect to each other.

Figure 3:
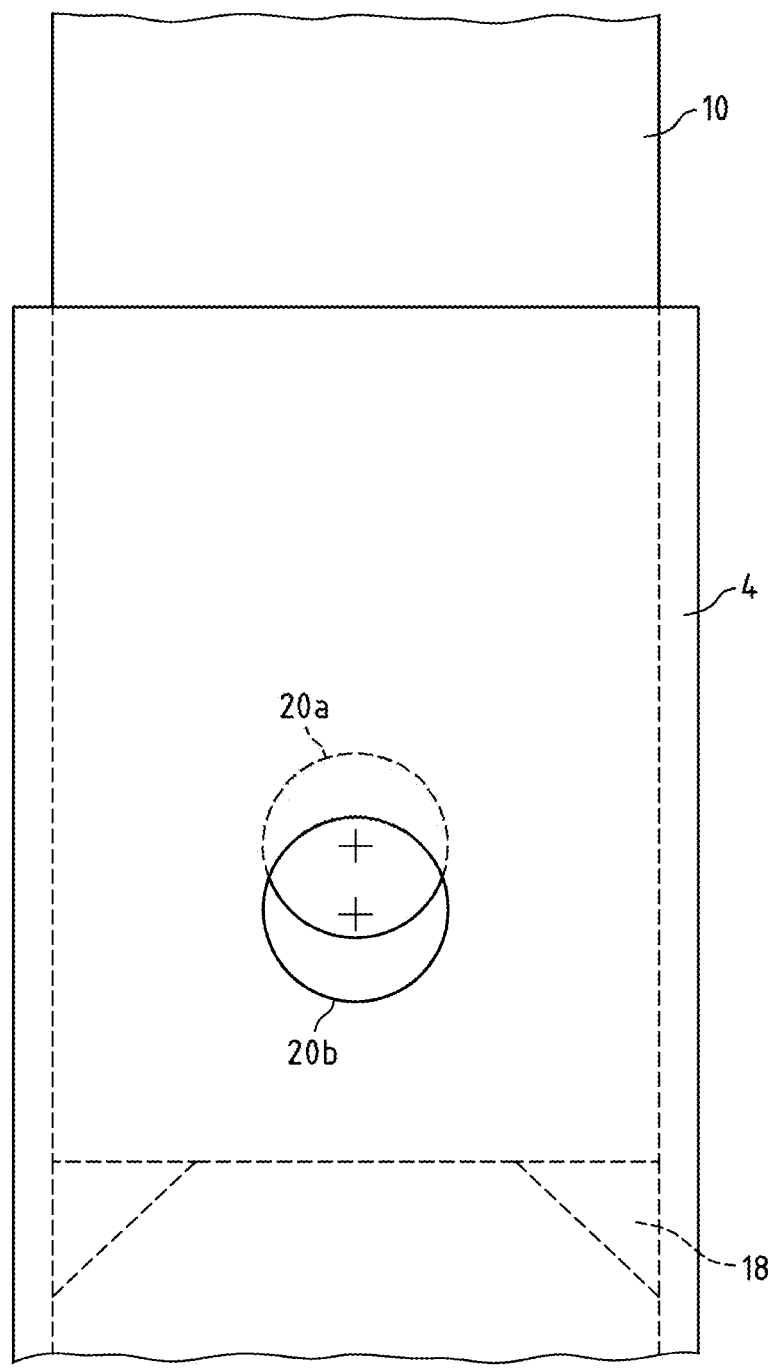
FIG. 3 is a view of overlapping cable entries.

For the feed-through of the cable 16, the cable feed-throughs are aligned in an overlapping manner with respect to one another, as shown in FIG. 3. In FIG. 3, it can be seen that the transition piece 10 is inserted into the hollow structural element 4. On the bottom side of the transition piece 10, the latter is supported in the hollow structural element 4 at inwardly facing stops 18. The hollow structural element 4 is aligned with the transition piece 10 in such a way that the cable feed-throughs 20a, 20b overlap one another.

The cable feed-through 20a at the transition piece 10 breaks through the wall 10c. The cable feed-through 20b on the hollow structural element 4 breaks through the wall 4c.

The cable feed-through 20a on the transition piece 10 may be longitudinally offset from the cable feed-through 20b of the hollow structural element 4. However, this offset is preferably smaller than a radius of at least one of the cable feed-throughs 20a, b, in any case smaller than the diameter of the smallest of the cable feed-throughs 20a, b.

The cable feed-throughs 20a, b are aligned with respect to each other in their angular position with respect to the longitudinal axis of the hollow structural member 4 and the transition piece 10. The cable 16 can be fed through the cable feed-throughs 20a, b.

Figure 4A:
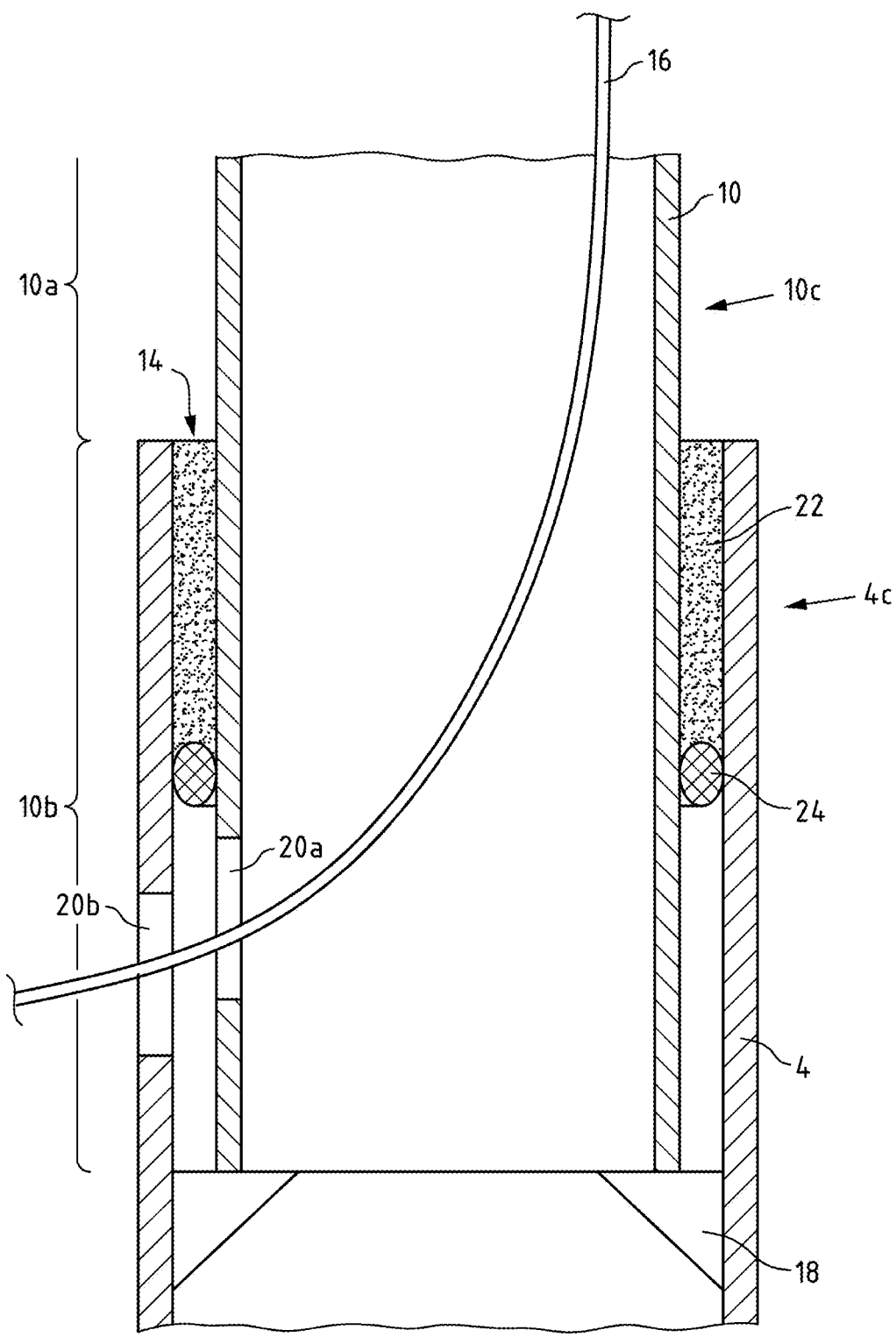
FIG. 4a is a sectional view through a cable entry.

One such cable feed-through is shown in FIG. 4a. Here, the transition piece 10 is inserted into the hollow structural element 4 and rests on the stops 18, which point radially inwards. The cable 16 is guided inside the transition piece 10 into the overlap area 10b. In the overlap region 10b, the cable feed-throughs 20a, b are aligned with each other so that the cable 16 can be passed through the two walls 4c, 10c.

As explained above, the annular space 14 is filled with filling material 22 in the case of a grout connection. The filler material 22 is introduced into the annular space 14 after the transition piece 10 has been inserted into the hollow structural element 4.

Now, in order to prevent the filling material 22 from escaping at the cable feed-throughs 20a, b, a circumferential seal 24 is proposed. The seal 24 is arranged circumferentially in the annular space 14 and seals the annular space 14 vertically.

Figure 4B:
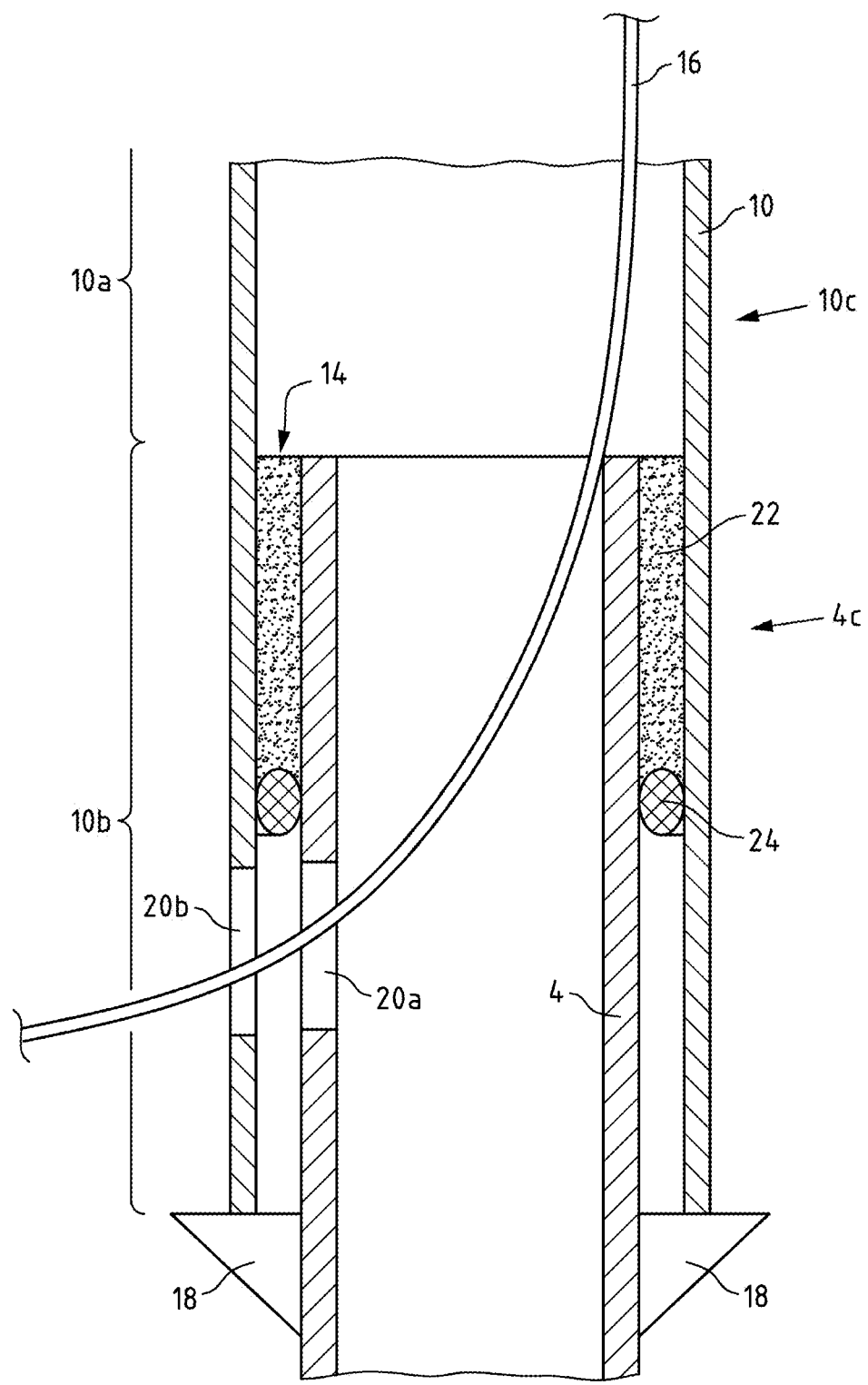

Another cable feed-through is shown in FIG. 4b. Here, the hollow structural element 4 is inserted into the transition piece 10 and rests on the stops 18, which point radially outward.

In contrast to FIGS. 3 and 4a, the transition piece 10 is supported on the hollow structural element 4 on the bottom side at stops 18 pointing radially outward. The hollow structural element 4 is aligned with the transition piece 10 such that the cable feed-throughs 20a, 20b overlap each other.

The cable feed-through 20a at the transition piece 10 breaks through the wall 10c. The cable feed-through 20b on the hollow structural element 4 breaks through the wall 4c.

The cable feed-through 20a on the transition piece 10 may be longitudinally offset from the cable feed-through 20b of the hollow structural element 4. However, unlike FIG. 4a, this offset is such that the cable feed-through 20b is located below the cable feed-through 20a.

As explained at the beginning, the annular space 14 is filled with filling material 22 in the case of a grout connection. The filling material 22 is introduced into the annular space 14 after the hollow structural element 4 has been inserted into the transition piece 10.

Figure 5:
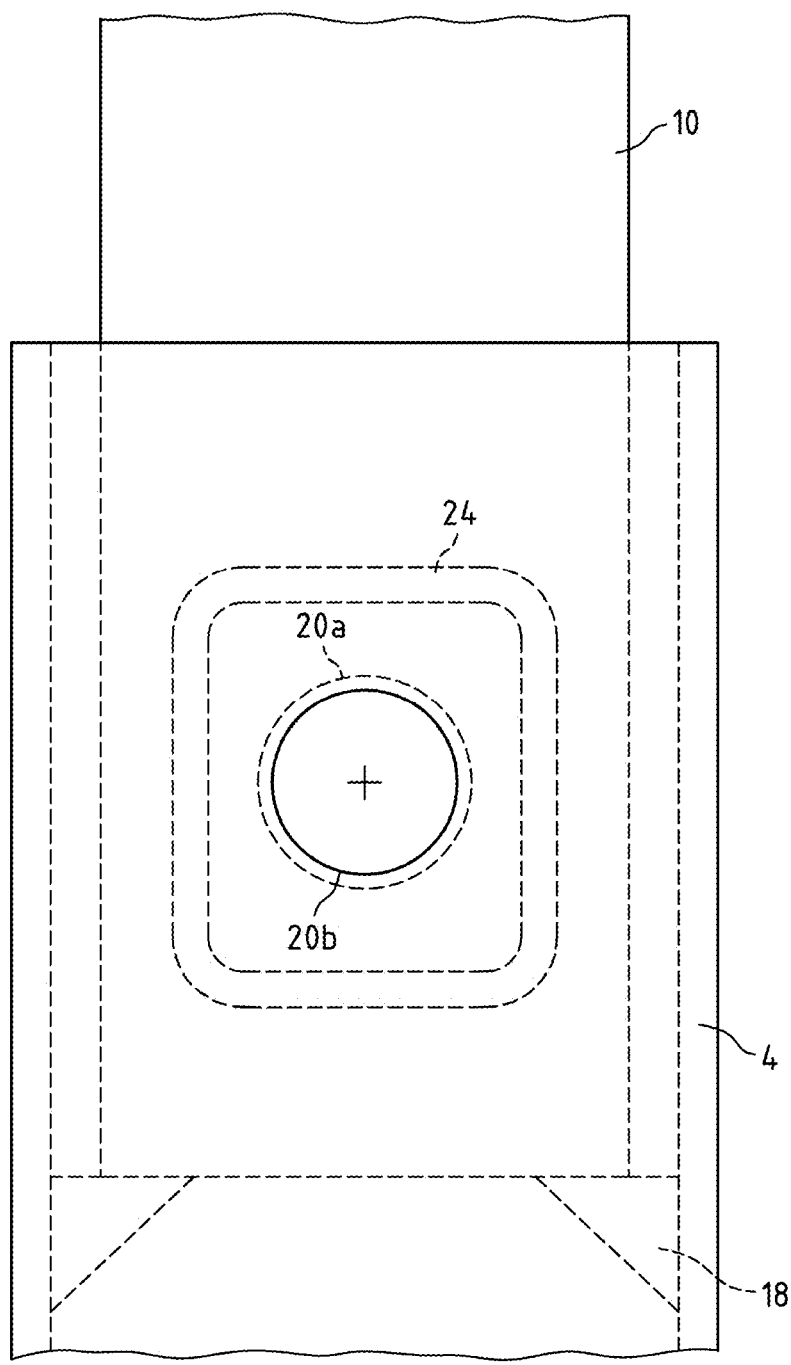
FIG. 5 is a cable feed-through with radial seal.

Another possibility of sealing the cable feed-throughs 20a, 20b is shown in FIG. 5. Here again, the transition piece 10 is inserted into the hollow structural element 4 and the cable feed-throughs 20a, 20b overlap each other. In FIG. 5, a complete overlap is shown. Radially circumferentially around the cable feed-through 20a, 20b, a seal 24 is provided in the annular space 14. The seal 24 thus does not run horizontally circumferentially in the annular space 14, but radially circumferentially around the cable feed-throughs 20a, b. Such a seal 22 also prevents the feed-through of filler material 22 into the cable feed-through 20a, b.

Figure 6A:
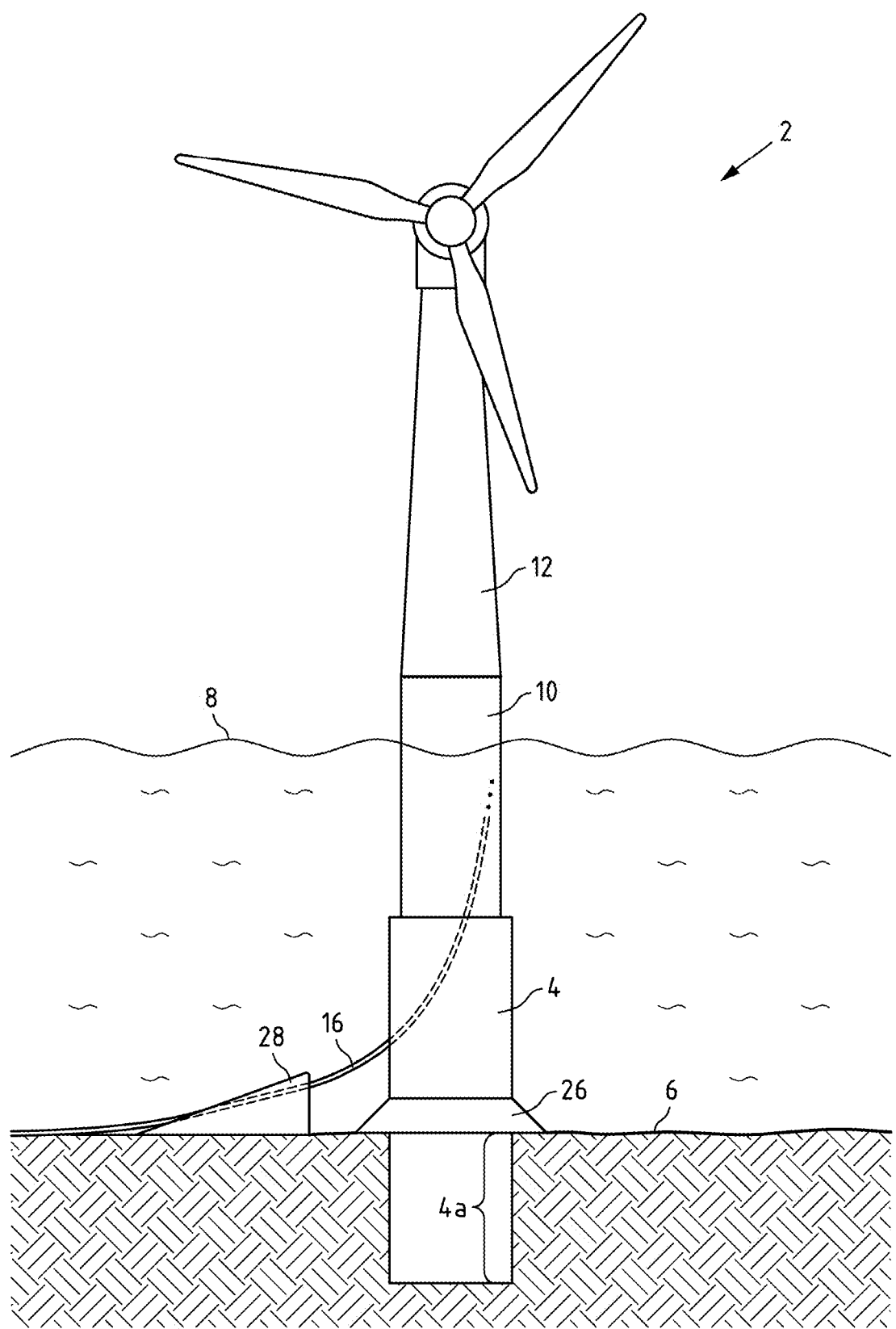

Another way of protecting the cable from damage is shown in FIG. 6a. Here it can be seen that the hollow structural element 4 is provided with a scour protection 26 at the seabed 6. The scour protection 26 is completely circumferential at the seabed 6 around the hollow structural element 4. The cable 16 is feed-through of the wind turbine 2 through the cable feed-through 20a, b in the manner shown. In order to prevent the free cable length outside the wind turbine 2 from becoming too long and thus mechanically stressing the cable 16 too much due to currents, a wedge-shaped structural element 28 is proposed.

The construction element 28 is arranged around the wind turbine 2 only in an angular section, unlike the scour protection 26 which is completely circumferential. The construction element 28 is such that it has a lower construction height radially to the wind turbine 2 with increasing radius. This wedge shape allows the cable 16 to be received at a greater height away from the seabed 6 and guided to the seabed 6 in a mechanically stabilized manner.

Figure 6B:
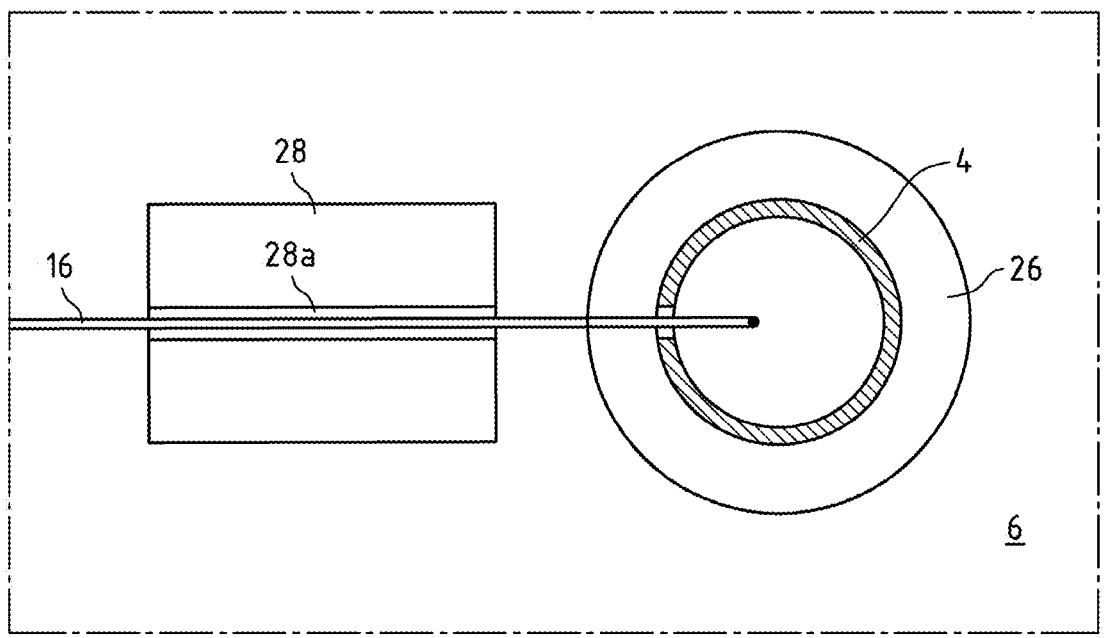
FIG. 6b is a cable on a structural element.

FIG. 6b shows a schematic top view of a structural element 28. Circumferentially around the hollow structural element 4 is the scour protection 26. In only a limited angular section around the hollow structural element 4 the structural element 28 is provided. A groove 28a may be provided on the surface of the structural element 28 facing away from the seabed 6. The groove 28a may also be referred to as a recess or the like. The cable 16 can be inserted into this groove 28a so that it is fixed on the construction element 28 and, in particular, cannot be pressed down from the construction element 28 by sea currents. The construction element 28 with all its features can be independently inventive and freely combined with all the features described herein.

Figure 7:
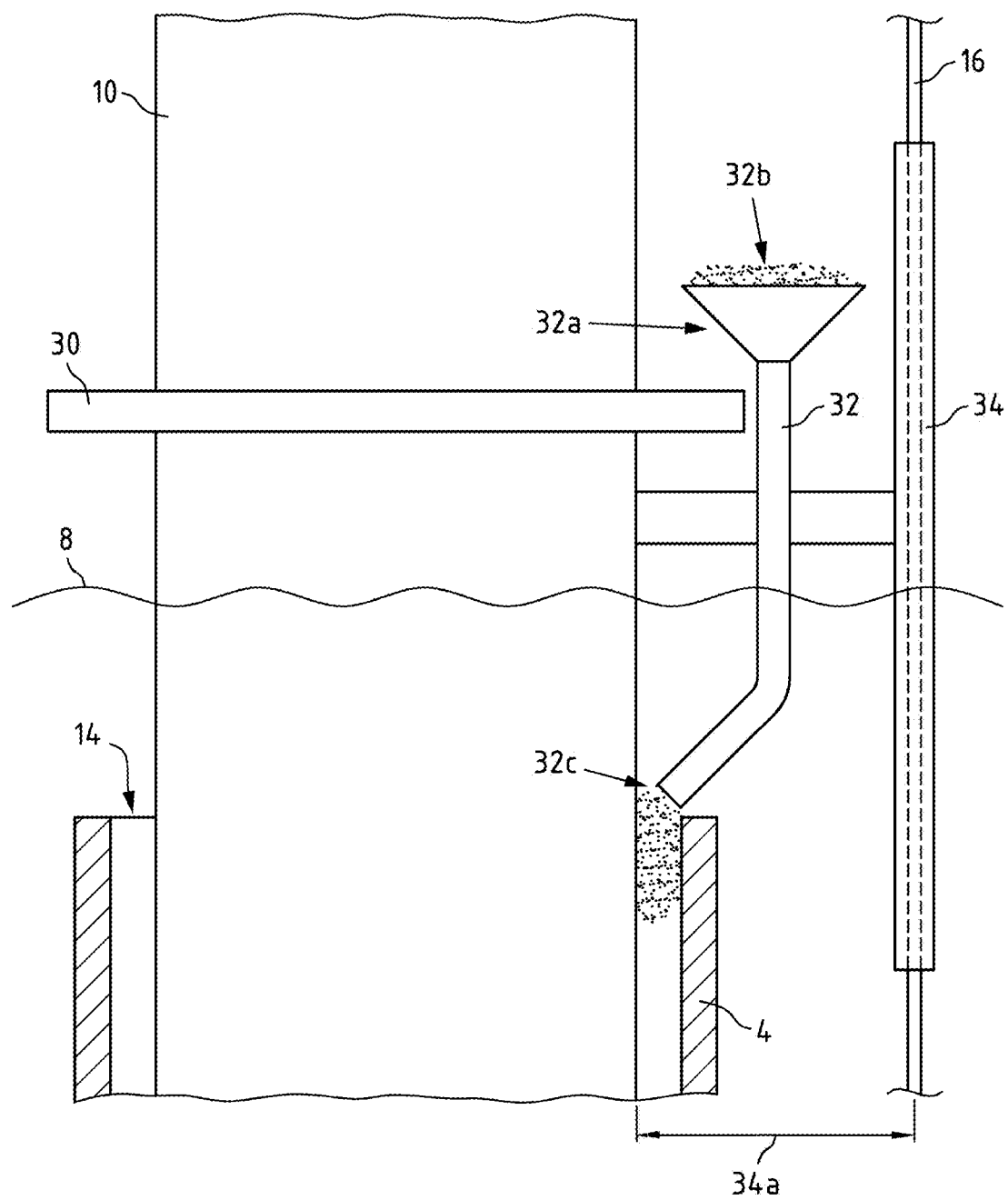
FIG. 7 is a boat landing platform.

Another independent aspect of the invention that may be combined with all aspects described herein, but which may be independently inventive, is shown in FIG. 7. A boat landing platform 30 may be disposed on the transition piece 10. The boat landing platform 30 is above the water surface 8. A ladder 32 and fender tubes 34 are arranged on the boat landing platform 30. The ladder 32 may be directly attached to the platform 30. Tie bars 32a may be provided on the ladder as tubes. On one side of the spar 32a, the spar 32a may have a funnel-shaped opening 32b. This funnel-shaped opening may be formed for receiving filler material 22. Filling material 22 can be passed through the spar 32a to the annular gap 14. The spar 32a may be shaped such that its lower opening 32c is shaped into or facing the annular gap 14. As a result, filler material 22 may be introduced into the annular gap 14 via the spar 32a to form a grout connection.

Alternatively or cumulatively to the cable routing with the cable feed-throughs 20a, b, the cable 16 may also be routed within the fender tube 34. Preferably, the fender tube 34 is directly attached to the transition piece 10. The fender tube may be routed from the boat landing platform to below the water surface 8. The fender tube 34 may be arranged at a distance 34a from the transition piece 10, this distance 34a being greater than the difference in radius between the hollow structural element 4 and the transition piece 10. In order to guide the fender tube 34 past the hollow structural element 4, the latter is spaced further from the transition piece 10 than the radius of the hollow structural element 4 is greater than the radius of the transition piece 10.

FIG. 8a shows a possible insertion aid. A radially outwardly pointing projection 40 is provided on the bottom side of the Transition Piece 10. An alignment aid 42 is provided at a front edge 4d of the hollow structural element 4. The alignment aid 42 may be shaped to taper away from the front edge 4d. Also, the alignment aid may have a groove in which the protrusion 40 can engage, as can be seen in the middle image.

In the region of the stop 18, a receptacle 44 can be arranged on the inner shell surface of the hollow structural element 4, pointing radially inwards. In this receptacle, the projection 40 can lie in the joined state, as can be seen in the right-hand picture. This ensures angular alignment between hollow structural element 4 and transition piece 10.

In FIG. 8a, a cross-section through Transition Piece 10 and Hollow Structural Element 4 is shown on the left in the unjoined state on the one hand and in the joined state on the other. On the right, the individual joining steps are shown from left to right.

Figure 8B:
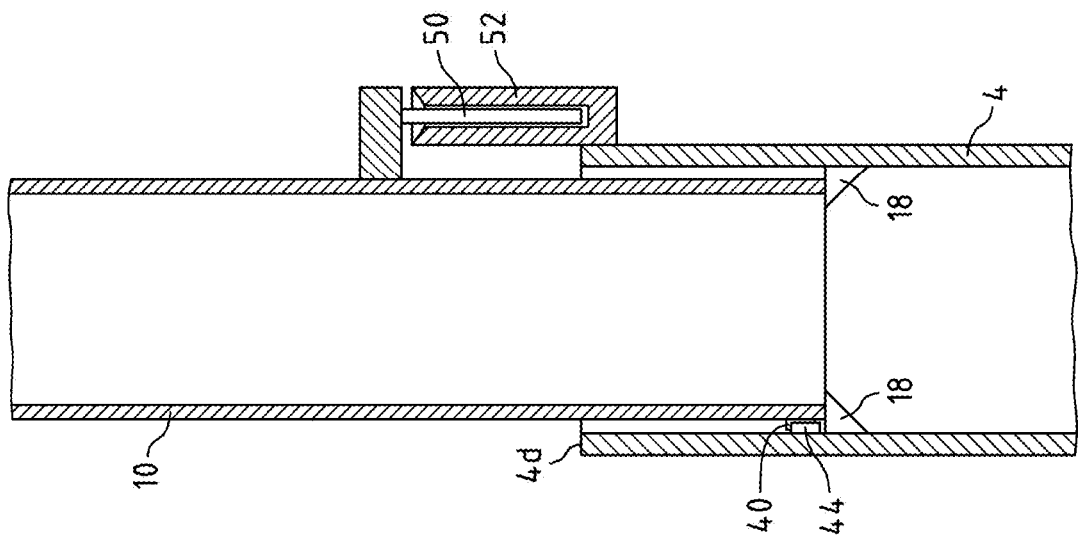
Figure 8B:
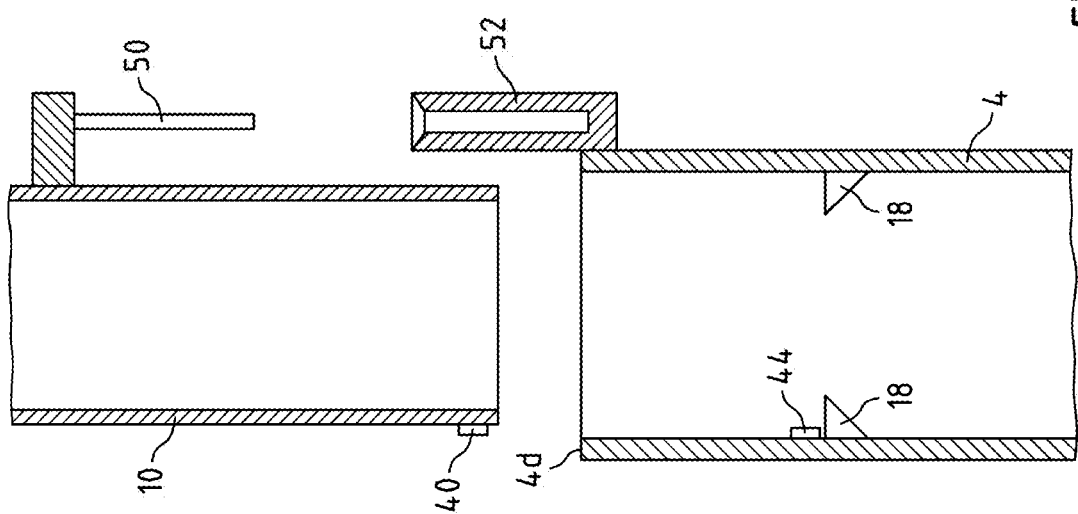
Figure 8B:
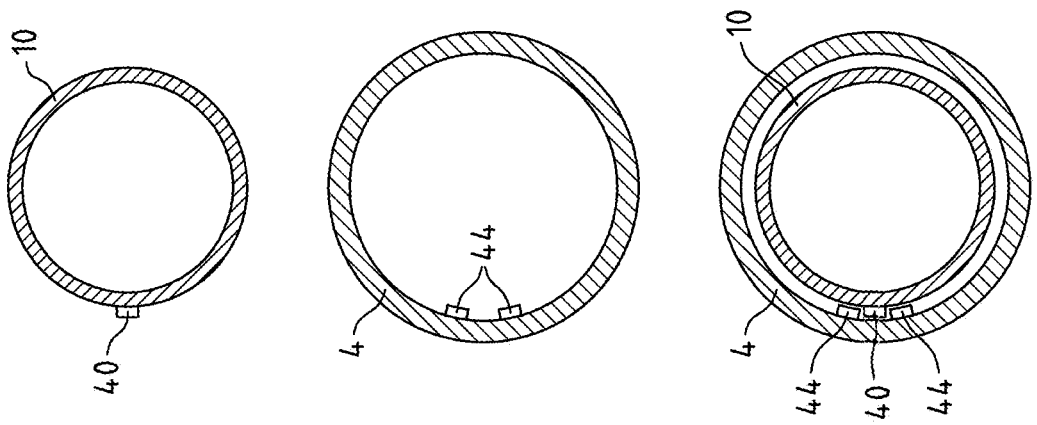

In FIG. 8b, receptacle 44 and projection 42 are formed as in FIG. 8a. These are used for angular alignment between transition piece 10 and hollow structural element 4.

In contrast to FIG. 8a, the insertion aid is formed on an outer shell surface of the transition piece 10. A rod-shaped element 50 can extend at a radial distance from the outer shell surface of the transition piece 10, in the longitudinal direction of the transition piece 10 towards the bottom of the transition piece 10.

Correspondingly, a receptacle 52 may be provided on the hollow structural element 4 at the end edge 4d. The receptacle 52 may extend from the end face edge 4d in the longitudinal direction of the hollow structural element 4 and have a groove or opening. The rod-shaped element 50 can engage in this groove or opening during insertion, so that the transition piece 10 can be inserted into the hollow structural element 4. The receptacle 52 may be, for example, a sleeve or a tube which receives the rod-shaped element 50. The receptacle 52 may have a radially widening opening to facilitate insertion of the rod-shaped element 50. When the rod-shaped element 50 is inserted into the receptacle 52, the receptacle 52 defines the radial position between the transition piece 10 and the hollow structural element 4. Through this, these two elements can be aligned with respect to each other and in particular their longitudinal axes can be aligned with respect to each other, in particular substantially collinear with respect to each other.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

REFERENCE LIST

2 Wind turbine
4 Hollow structural element
4a Embedment length
4b Protruding length
4c Wall
4d End face
6 Seabed
8 Water surface
10 Transition piece
10a Transition area
10b Overlap area
10c Wall
14 Annular space
16 Cable
18 Stop
20a, b Cable feed-through
22 Filler material
24 Seal
26 Scour protection
28 Construction element
28a Groove
30 Landing platform
32 Ladder
32a Spar
32b Opening
32c Opening
34 Fender tube
40 Protrusion
42 Alignment aid
44 Receptacle
50 Bar-shaped element
52 Receptacle

The invention claimed is:

1. A wind turbine foundation structure comprising,
a hollow structural element having a longitudinally extending, circumferential wall, a first cable feed-through being disposed in the circumferential wall and breaking through the circumferential wall,
a transition piece comprising:
   an overlap region projecting into the hollow structural element and a transition region projecting out of the hollow structural element at an end face of the hollow structural element, and
   a transition piece circumferential wall extending in a longitudinal direction, wherein a second cable feed-through breaks through the transition piece circumferential wall and is arranged in the overlap region in the transition piece circumferential wall, and
wherein
in an assembled state of the hollow structural element and transition piece, the first and the second cable feed-through bear against one another and at least partially overlap each other;
wherein
a cable is guided from the interior of the transition piece through the first and the second cable feed-through.

2. The wind turbine foundation structure of claim 1, wherein
the cable feed-through of the hollow structural element is in the assembled state located between 1.0m and 5m above seabed.

3. The wind turbine foundation structure of claim 1, wherein in an annular space between the inner shell surface of the hollow structural element and the outer shell surface of the transition piece, a seal abutting the shell surfaces is circumferentially arranged.

4. The wind turbine foundation structure of claim 3, wherein
the seal is expandable, such that the volume of the seal can be increased after assembly of the hollow structural element and the transition piece.

5. The wind turbine foundation structure of claim 4, wherein the seal is pneumatically or hydraulically filled with a filling material.

6. The wind turbine foundation structure according to claim 3, wherein
the annular space between the hollow structural element and the transition piece is at least partially grouted, wherein an upper edge of the grout connection in longitudinal direction of the hollow structural element is below at least a lower edge of one of the cable feed-throughs.

7. The wind turbine foundation structure of claim 3, wherein in the longitudinal direction of the hollow structural element a seal is arranged above the cable feed-through and/or below the cable feed-through.

8. The wind turbine foundation structure of claim 1, wherein
in an annular space between the inner shell surface of the hollow structural element and the outer shell surface of the transition piece a seal is guided around the cable feed-throughs, is arranged at a radial distance from the cable feed-throughs.

9. The wind turbine foundation structure of claim 8, wherein
the seal encloses the cable feed-through in a circular or elliptical manner.

10. The wind turbine foundation structure of claim 1, wherein
insertion aids arranged at an upper front edge of the hollow structural element cooperate with insertion aids arranged at a lower front edge of the transition piece, such that a relative alignment of the azimuth angles of the hollow structural element and the transition piece is defined.

11. The wind turbine foundation structure of claim 10, wherein
the insertion aids are radially inwardly and radially outwardly projecting projections and recesses that interlock with each other.

12. The wind turbine foundation structure of claim 1, wherein
a wedge-shaped structural element is arranged at a radial distance from the hollow structural element, wherein the structural element tapers away from the hollow structural element.

13. The wind turbine foundation structure of claim 1, wherein
a recess extending in a radial direction is arranged on a surface of the construction element for receiving the cable.

14. The wind turbine foundation structure of claim 1, wherein
a radially inwardly facing abutment is formed on the inner shell surface of the circumferential wall in an end region of the hollow structural element.

15. The wind turbine foundation structure of claim 1, wherein
the hollow structural element is hollow cylindrical.

16. The wind turbine foundation structure of claim 1, wherein
the circumferential wall is mechanically prestressed.

17. The wind turbine foundation structure of claim 16, wherein the circumferential wall is mechanically prestressed with the prestressing force of more than 5% of the compressive strength of the circumferential wall.

18. The wind turbine foundation structure of claim 17, the prestressing force being applied in the longitudinal direction.

19. The wind turbine foundation structure of claim 16, wherein
the circumferential wall is mechanically prestressed with the prestressing force of more than 15% of the compressive strength of the circumferential wall.

20. The wind turbine foundation structure of claim 19, the prestressing force applied in the longitudinal direction.

21. The wind turbine foundation structure of claim 1, wherein
the hollow structural element is formed from a reinforced building material wherein the reinforcement is a is metal-reinforcement and/or
the reinforcement (at 98% of all measuring points) has not less than 26 mm concrete cover and/or
the reinforcement is a ferritic stainless reinforcing steel, the chromium content of does not exceed 18M % and may contain molybdenum and/or
the reinforcement is an austenitic stainless reinforcing steel, which contains at least 5%, up to 14M % nickel and 12M %-22M %, chromium, and/or
the reinforcement is a ferritic-austenitic stainless reinforcing steel containing at least 18M % chromium and 2%-8% nickel and optionally molybdenum.

22. The wind turbine foundation structure of claim 1, wherein
an upper end face of the hollow structural element is metallically reinforced, and/or
a density of the reinforcement in an end region of the hollow structural element at en upper-side and/or lower-side end face of the hollow structural element is greater than in a central region of the hollow structural element.

23. The wind turbine foundation structure of claim 22, wherein a metallic reinforcement protrudes from the upper end face of the hollow structural element.

24. The wind turbine foundation structure of claim 23, wherein the metallic reinforcement protrudes completely circumferentially from the upper end face of the hollow structural element.

25. The wind turbine foundation structure of claim 1, wherein
a radially outwardly pointing collar is formed on the outer shell surface of the circumferential wall in an end region of the hollow structural element.

26. The wind turbine foundation structure of claim 1, wherein
the hollow structural element is formed from a building material and the building material is sealed.

27. The wind turbine foundation structure of claim 26, wherein the building material is sealed with a sealing film.

28. The wind turbine foundation structure of claim 1, wherein
the cable feed-through of the hollow structural element is in the assembled state located between 1.5m and 3.5m above seabed.

29. The wind turbine foundation structure of claim 1, wherein the hollow structural element is formed from a reinforced building material wherein
the reinforcement is a is metal-reinforcement and/or
the reinforcement (at 98% of all measuring points) has not less than 40 mm concrete cover and/or
the reinforcement is a ferritic stainless reinforcing steel, the chromium content of does not exceed 18M % and may contain molybdenum and/or
the reinforcement is an austenitic stainless reinforcing steel, which contains at least 8% up to 14M % nickel and 15%-20% chromium, and/or
the reinforcement is a ferritic-austenitic stainless reinforcing steel containing at least 18M % chromium and 2%-8% nickel and optionally molybdenum.

30. A wind turbine foundation structure comprising,
a hollow structural element having a longitudinally extending, circumferential wall, a first cable feed-through being disposed in the circumferential wall and breaking through the circumferential wall,
a transition piece comprising:
  an overlap region projecting into the hollow structural element and a transition region projecting out of the hollow structural element at an end face of the hollow structural element, and
  a transition piece circumferential wall extending in a longitudinal direction, wherein a second cable feed-through breaks through the transition piece circumferential wall and is arranged in the overlap region in the transition piece circumferential wall, and
wherein
in an assembled state of the hollow structural element and transition piece, the first and the second cable feed-through bear against one another and at least partially overlap each other;
wherein
a center point of the cable feed-through of the hollow structural element is offset in the longitudinal direction of the hollow structural element with respect to a center point of the cable feed-through of the transition piece, wherein the distance of the center points is smaller than an opening radius of at least one of the cable feed throughs.

31. A wind turbine foundation structure comprising,
a hollow structural element having a longitudinally extending, circumferential wall, a first cable feed-through being disposed in the circumferential wall and breaking through the circumferential wall,
a transition piece comprising:
  an overlap region projecting into the hollow structural element and a transition region projecting out of the hollow structural element at an end face of the hollow structural element, and
  a transition piece circumferential wall extending in a longitudinal direction, wherein a second cable feed-through breaks through the transition piece circumferential wall and is arranged in the overlap region in the transition piece circumferential wall, and
wherein
in an assembled state of the hollow structural element and transition piece, the first and the second cable feed-through bear against one another and at least partially overlap each other;
wherein
the hollow structural element is formed at least in parts from at least one of
  a building material with a water/cement ratio (w/c) of less than 0.45, and/or
  a building material with a strength class of at least C40/50, according to EN 206 and EN 1992, and/or
  a building material with a pore content (air voids) of less than 5%, and/or
  a building material with a cement content of at least 350 kg/m$^3$, and/or
  a building material with a porosity P28d of less than 12 vol %, as measured by a mercury pressure porosimetric measurement.

32. The wind turbine foundation structure of claim 31, wherein
the hollow structural element is formed at least in parts from at least one of
  the building material with the water/cement ratio (w/c) of less than 0.35 or less than 0.3, and/or
  the building material with the strength class of at least C70/80, according to EN 206 and EN 1992, and/or
  the building material with the pore content (air voids) of less than 3%, and/or
  the building material with the cement content of more than 450 kg/m$^3$, and/or
  the building material with the porosity P28d of less than an 10 vol %, and P90d of less than 8 vol % as measured by the mercury pressure porosimetric measurement.

33. The wind turbine foundation structure of claim 31, wherein
the hollow structural element is formed at least in parts from at least one of
  the building material with the water/cement ratio (w/c) of less than 0.35 or less than 0.3, and/or
  the building material with the strength class of at least C100/115 according to EN 206 and EN 1992, and/or
  the building material with the pore content (air voids) of less than 2%, and/or
  the building material with the cement content of more than 550 kg/m 3, and/or
  the building material with the porosity P28d of less than 10 vol %, and P90d of less than 8 vol % as measured by the mercury pressure porosimetric measurement.

34. The wind turbine foundation structure of claim 31, wherein
the hollow structural element is formed at least in parts from at least one of
  the building material with the water/cement ratio (w/c) of less than 0.35 or less than 0.3, and/or
  the building material with the strength class of at least C100/115 according to EN 206 and EN 1992, and/or
  the building material with the pore content (air voids) of less than 2%, and/or
  the building material with the cement content of up to 600 kg/m$^3$, and/or
  the building material with the porosity P28d of less than 10 vol %, and P90d of less than 8 vol % as measured by the mercury pressure porosimetric measurement.

* * * * *